A. H. BAIRD.
COMPOSITION TOOTHPICK.
APPLICATION FILED FEB. 7, 1910.

973,842.

Patented Oct. 25, 1910.

Witnesses:
C. F. Bassett
C. B. Benjamin

Inventor
Albert H. Baird
By Frederick Benjamin
Atty.

UNITED STATES PATENT OFFICE.

ALBERT H. BAIRD, OF DELTA, COLORADO.

COMPOSITION TOOTHPICK.

973,842.  Specification of Letters Patent.  Patented Oct. 25, 1910.

Application filed February 7, 1910. Serial No. 542,500.

*To all whom it may concern:*

Be it known that I, ALBERT H. BAIRD, citizen of the United States, residing at Delta, in the county of Delta and State of Colorado, have invented certain new and useful Improvements in Composition Toothpicks, of which the following is a specification.

The object of this invention is to produce a tooth pick which will not only serve the purposes of ordinary quill and wooden tooth picks of commerce but will possess antiseptic and breath perfuming properties and can be used without any injurious effects upon the teeth or gums.

A further object of my invention is to provide a composition tooth-pick that will retain its shape and rigidity a substantial length of time so that the work which it is intended to perform can be completed with a single tooth-pick.

In the accompanying drawing I have illustrated various forms or shapes of tooth picks which can be readily produced from the compound and method hereinafter described.

Figure 1:
Figure 2:
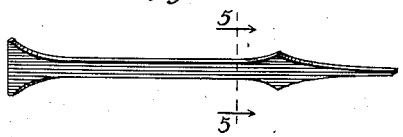
Figure 3:
Figure 4:
Figure 5:

Figures 1 to 4 inclusive are perspective views of tooth picks of different shapes but on a magnified scale, and Fig. 5 is an enlarged cross-section on the line 5—5 of Fig. 2.

Referring to the details of my invention, I take nine parts of the best grade of gelatin of commerce and one part of isinglass and dissolve same in five hundred parts of boiling water in which one per cent. of chrome alum has been dissolved. This gelatinous mass is allowed to stand until it becomes a jelly which can be cut and molded into the form of tooth-picks desired. The picks thus formed are dried either with or without formaldehyde in the open air until they are hard and firm. They are then dipped in a solution of keratin which is made by dissolving keratin in glacial acetic acid by the aid of slight heat, and when the solution is clear the immersion takes place. The picks are then immersed for a very short time, in a two per cent. solution of chrome alum. The picks thus made are now coated with flexible collodion (U. S. P.) by dipping them several times so as to produce a clear transparent film.

In the gelatin and in each of the coating solutions I use a liquid antiseptic such as Lister's solution, and add to the last coating an aromatic or sweet substance such as oil of wintergreen, peppermint, cinnamon or other suitable substitute.

The tooth-picks made substantially as described are clear and polished, possessing sufficient rigidity to maintain their shape and function and elastic enough to be easily pressed between the teeth. If they should be swallowed they will not stick in the throat and will readily dissolve in the stomach without injury to the user. The antiseptic properties permeate the entire structure and the aromatic flavor imparts a pleasant taste and destroys or neutralizes foul breath.

The cost of manufacture is so low that my improved tooth pick can be economically thrown away after being used but once.

Having thus described my invention what I claim is:—

1. As a new article of manufacture, a tooth-pick composed of a gelatinous base, a first coating of keratin solution and a final coating of collodion.

2. As a new article of manufacture, a tooth-pick composed of a gelatinous base, a coating of keratin solution and a final coating of collodion, said base and coating substances including a suitable antiseptic.

3. As a new article of manufacture, a tooth-pick composed of a gelatinous base comprising isinglass and chrome alum, dried and formed into suitable forms, a first coating of a keratin solution subjected to a solution of chrome alum, and a final coating of collodion.

In testimony whereof I affix my signature in the presence of two witnesses.

ALBERT H. BAIRD.

Witnesses:
F. W. GROVE,
L. H. McCOY.